Dec. 17, 1929.                O. N. BRYANT                1,740,153
                                INDICATOR
                             Filed May 17, 1929

WITNESSES:
E. Lutz

INVENTOR
O. N. BRYANT.
BY
A. B. Reavis
ATTORNEY

Patented Dec. 17, 1929

1,740,153

UNITED STATES PATENT OFFICE

OZRO N. BRYANT, OF MOORES, PENNSYLVANIA, ASSIGNOR TO WESTINGHOUSE ELECTRIC & MANUFACTURING COMPANY, A CORPORATION OF PENNSYLVANIA

INDICATOR

Application filed May 17, 1929. Serial No. 363,979.

My invention relates to indicators and more particularly to that type which is used for indicating when two elements are rotating synchronously, and it has for an object to produce apparatus of this character which is extremely accurate, durable and which is simple and cheap to construct.

Figure 1:
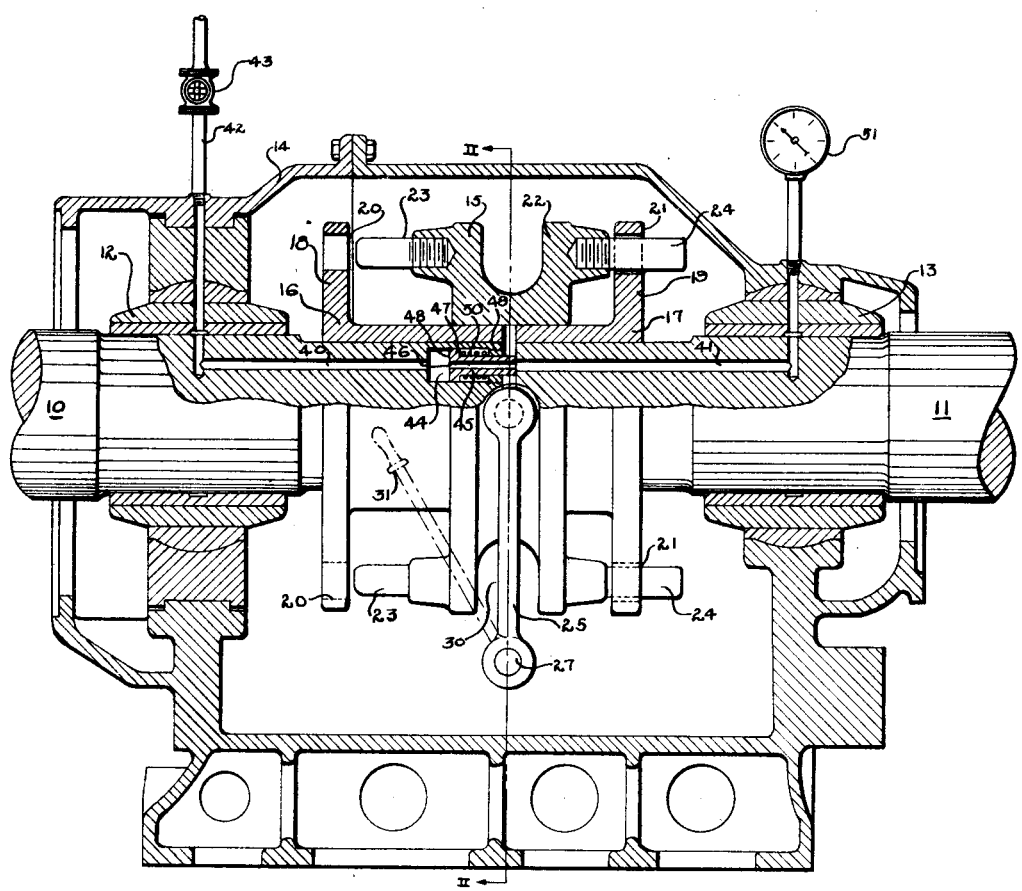
Figure 2:
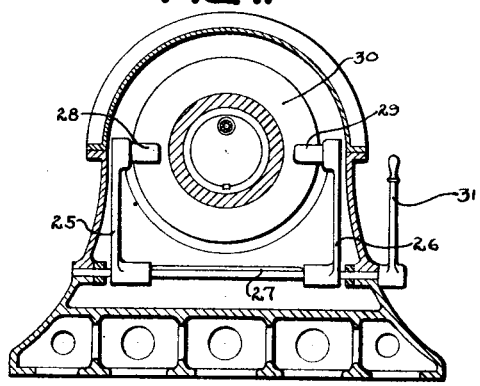

This and other objects are effected by my invention, as will be apparent from the following description and claims taken in connection with the accompanying drawings, forming a part of this application, in which:

Fig. 1 is a longitudinal sectional view illustrating a preferred embodiment of my invention; and Fig. 2 is a transverse sectional view taken on the line II—II of Fig. 1, the view being on a reduced scale.

According to the embodiment of my invention illustrated on the accompanying drawing, I provide a pair of coaxially arranged shafts having opposed end surfaces. Each of the shafts is provided with a passageway extending through the end thereof and the adjacent ends of the passages are spaced at substantially the same distance from the common axis of rotation so that they may register with one another. Means is provided for delivering fluid under pressure to one of the passages, and a pressure gauge is connected to the other passage. If there be relative rotation between the two shafts there will be a movement of the needle on the pressure gauge each time the ends of the passages come into registration. It will thus be seen that if the needle on the gauge be stationary, either at no pressure or at full pressure, the shafts will be rotating at the same speed.

Referring now in detail to the construction illustrated in the accompanying drawing, the reference numerals 10 and 11 indicate the ends of a pair of coaxially-arranged shafts. The shafts are supported for rotation by suitable bearings 12 and 13, respectively, which bearings are, in turn, supported by a bearing housing 14.

The shafts 10 and 11 may be parts of any two mechanisms which are desired to be rotated at the same speed such, for example, as either a turbine and a generator, or a geared cruising turbine and the main turbine of a ship. In such apparatus, a disconnectible coupling is provided for rigidly connecting the ends of the shafts together. Such a coupling is indicated in its entirety by the reference numeral 15 on the accompanying drawing.

The coupling 15 includes a pair of elements 16 and 17 keyed to the ends of the shafts 10 and 11, respectively, and provided with flange portions 18 and 19, respectively. The flange portion 18 is provided with a plurality of openings 20, 20, and the flange portion 19 is provided with a plurality of like openings 21, 21. A coupling member 22 is movable axially to engage the pins or projections 23, 23 and 24, 24 thereof with the openings 20, 20 and 21, 21, respectively, to provide a rigid coupling between the two shafts, or to disengage one set of pins or projections with respect to the corresponding openings.

In Fig. 1, the coupling member 22 is shown as being in the position occupied when the two shafts are disconnected. A movement towards the left of the member 22 would cause the pins 23, 23 to enter the openings 20, 20 and connect the shafts 10 and 11. This movement is effected by any suitable means such, for example, as by arms 25 and 26 keyed to an operating shaft 27 and having projections 28 and 29, respectively, extending within an annular groove 30 provided in the member 22. The operating shaft may be oscillated by a suitable lever 31 keyed to an extension of said shaft.

Obviously, it is necessary that the two shafts 10 and 11 be rotating at exactly the same speed before the clutch 15 be operated to rigidly connect the shafts. As stated, I have provided an improved means for indicating when the two shafts are operating synchronously.

The shafts 10 and 11 are provided with longitudinally-extending passages 40 and 41, respectively, which latter extends through the adjacent end faces of the shafts. A conduit 42 serves to supply any suitable fluid under pressure to the end of passage 40, and a hand-operated valve 43 is provided for controlling the flow of this fluid through the conduit 42.

The passage 40 is provided at the end thereof adjacent the shaft 11 with an enlarged cylindrical portion or chamber 44. A sealing member 45 fits within the cylindrical portion 44 and is movable longitudinally thereof. The sealing member is provided with a bore 46 extending longitudinally therethrough, and a flanged inner end portion 47 providing an inner piston face 48.

A bushing member 49 is secured within the end of the enlarged portion 44 and is provided with an opening through which the sealing member extends. A coil spring 50 is disposed between the flanged end 47 and the bushing 49 and serves to urge the outer end of the sealing member 45 away from the shaft 11. When the oil under pressure is admitted to the passage 40, the force of the spring is overcome by the pressure of oil against the piston face 48, and as a result, the outer end of the sealing member is forced against the end face of the shaft 11.

The inner end of the passage 41 is spaced at substantially the same distance from the common axis of rotation as the inner end of the passage 40 and likewise the bore 46. When the fluid under pressure is admitted to the passage 40 a portion of this fluid will be projected into the passage 41 each time the ends of the bore 46 and passage 41 register. A pressure gauge 51 is connected to the other end of passage 41 and serves to indicate when the fluid under pressure is in the passage.

The operation of my improved apparatus will be apparent from the above description. If one of the shafts is rotating and it is desired that the other shaft be brought to the same speed so that the two be coupled, the valve 43 is opened to admit fluid under pressure to the passage 40 and also the passage 41 when the latter comes into registry with the bore 46. Each time the passage 41 and bore 46 register, there will be a movement of the needle on the pressure gauge 51.

The movements of the needle on the pressure gauge will become less and less frequent as the shafts 10 and 11 approach synchronous speed until finally the needle remains stationary, at which time, the shafts will be rotating at the same speed. At this time, the needle may either register no pressure or full pressure, depending upon whether or not the bore 46 and passage 41 are in registry. With the shafts rotating at the same speed, the clutch may be then operated to rigidly connect the two shafts, after which the valve 43 may be closed, which will result in the sealing member 45 being retracted by the spring 50.

The angular position of the passages 40 and 41 relatively to the openings 20 and 21 are such that, when steady pressure is indicated, not only are the shafts in synchronous speed but the disengaged openings are aligned with the disengaged pins or projections 23 and 22 of the movable coupling member, whereupon the latter may be moved to coupling position.

From the above description, it will be readily seen that I have provided a simple and extremely accurate means for indicating when the two shafts are rotating synchronously, which is also very simple, durable and cheap to construct.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus of the character described, the combination of a pair of rotary elements arranged coaxially and having opposed surfaces disposed adjacent one another; each element having a passageway extending through its respective aforementioned surface, and the adjacent ends of the passageways being spaced at substantially equal distances from the axis of rotation; means for delivering fluid under pressure to one of the passageways; and pressure indicating means connected to the other of said passageways.

2. In apparatus of the character described, the combination of a pair of rotary elements arranged coaxially and having opposed surfaces; each element having an elongated passage therein extending through the aforementioned surface thereof, and the adjacent ends of the passages being spaced at substantially equal distances from the axis of rotation; the passage in one of the elements being enlarged at the end thereof adjacent the other element; a member fitting said enlarged portion and movable longitudinally therein so as to contact at its outer end, with the opposed surface of the other element; said movable member having a piston face on its inner end and a bore extending therethrough; means for delivering at will, fluid under pressure to the inner end of the passage in the one element, whereby the movable member will be forced against the opposed surface of the other element and the fluid will be forced into the end of the other passage when the latter comes into registry with the end of the bore; and pressure indicating means connected to the passage in the other element.

3. In apparatus of the character described, the combination of a pair of rotary elements arranged coaxially and having opposed surfaces; each element having an elongated passage therein extending through the aforementioned surface thereof, and the adjacent ends of the passages being spaced at substantially equal distances from the axis of rotation; the passage in one of the elements being enlarged at the end thereof adjacent the other element; a member fitting said enlarged portion and movable longitudinally therein to contact at its outer end with the opposed surface of the other element; said movable member having a piston face on its inner end and a bore extending therethrough; means for delivering at will, fluid under pressure to the inner end of the passage in the one element, whereby the movable member will be forced against the opposed surface of the other element and the fluid will be forced into the end of the other passage when the latter comes into registry with the end of the bore; and pressure-indicating means connected to the passage in the other element; and means for normally holding the movable member out of contact with the surface of the other element.

4. In apparatus of the character described, the combination of a pair of shafts arranged in end to end relation with their axes of rotation substantially coincident; each of the shafts having a passageway therein extending through the end thereof adjacent the other shaft; the adjacent ends of the passageways being disposed at substantially equal distances from their axes of rotation, means providing for the supply of fluid under pressure to one of the passageways; and pressure indicating means connected to the other passageway.

5. In apparatus of the character described, the combination of a pair of shafts arranged in end-to-end relation with their axes of rotation substantially coincident; each of the shafts having a passageway therein extending through the end thereof adjacent the other shaft; the adjacent ends of the passageways being disposed at substantially equal distances from their axes of rotation; means providing for the supply of fluid under pressure to one of the passageways; pressure-indicating means connected to the other passageway; and disconnectible coupling means for rigidly connecting the two shafts.

6. In apparatus of the character described, the combination of a pair of shafts arranged in end-to-end relation with their axes of rotation substantially coincident; each of the shafts having a passageway therein extending through the end thereof adjacent the other shaft; the adjacent ends of the passageways being disposed at substantially equal distances from their axes of rotation; means providing for the supply of fluid under pressure to one of the passageways; pressure-indicating means connected to the other passageway; and disconnectible coupling means including interengaging elements carried by the shafts for rigidly connecting the latter, the interengaging elements being so disposed with relation to one another and with relation to the angular position of the adjacent ends of the passageways that when the ends of the passageways are in registry the elements will be in position to be readily engaged.

In testimony whereof, I have hereunto subscribed my name this 15th day of May, 1929.

OZRO N. BRYANT.